(12) United States Patent
Jepperson et al.

(10) Patent No.: US 12,200,022 B1
(45) Date of Patent: Jan. 14, 2025

(54) DIGITAL ASSISTANT FEEDBACK AND STATUS UPDATES

(71) Applicant: INTERNATIONAL BUSINESS MACHINES CORPORATION, Armonk, NY (US)

(72) Inventors: Jacob Ryan Jepperson, St. Paul, MN (US); Logan Bailey, Atlanta, GA (US); Melanie Dauber, Oceanside, NY (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/454,248

(22) Filed: Aug. 23, 2023

(51) Int. Cl.
  *G06F 15/16* (2006.01)
  *H04L 65/40* (2022.01)
  *H04L 67/306* (2022.01)

(52) U.S. Cl.
  CPC .......... *H04L 65/40* (2013.01); *H04L 67/306* (2013.01)

(58) Field of Classification Search
  CPC .............................. H04L 65/40; H04L 67/306
  USPC ........................................................ 709/204
  See application file for complete search history.

(56) References Cited

U.S. PATENT DOCUMENTS

| | | | |
|---|---|---|---|
| 8,374,590 B1 * | 2/2013 | Mikan | H04H 60/45 455/414.3 |
| 8,498,396 B2 | 7/2013 | O'Sullivan | |
| 8,930,191 B2 | 1/2015 | Gruber | |
| 11,128,484 B2 | 9/2021 | Fahrendorff | |
| 11,663,024 B2 | 5/2023 | Decrop | |
| 2007/0299966 A1 * | 12/2007 | Crawford | H04L 67/12 709/224 |
| 2012/0284637 A1 * | 11/2012 | Boyer | G06Q 10/109 715/751 |
| 2013/0217350 A1 * | 8/2013 | Singh | G06Q 10/109 702/19 |
| 2013/0339431 A1 * | 12/2013 | Yannakopoulos | H04L 12/1831 709/204 |
| 2017/0109706 A1 * | 4/2017 | Sankaran | H04W 4/027 |
| 2023/0136777 A1 * | 5/2023 | Kotnis | H04L 12/1818 709/204 |
| 2024/0042313 A1 * | 2/2024 | Benedetto | A63F 13/355 |

FOREIGN PATENT DOCUMENTS

| | | |
|---|---|---|
| CN | 107491284 B | 5/2021 |
| IN | 202047055697 A | 1/2021 |
| IN | 202211052886 A | 9/2022 |

* cited by examiner

*Primary Examiner* — Alan S Chou
(74) *Attorney, Agent, or Firm* — Tihon Poltavets

(57) ABSTRACT

Described is a method to provide feedback and status updates during virtual collaborative sessions by monitoring, via a primary device associated with a user, a user status for the user participating in a collaborative session with one or more other users. In response to determining a user status change for the user is detected, the method can determine a response for the user to provide to the one or more other users based on a user profile and a context for the user status change, wherein the status change indicates an unavailability of the user. In response to determining the response is required for the user to provide the one or more other users, the method can send the response to a user device associated with each of the one or more other users.

15 Claims, 4 Drawing Sheets

DIGITAL ASSISTANT FEEDBACK AND STATUS UPDATES

BACKGROUND

This disclosure relates generally to digital assistants, and in particular to utilizing a digital assistant to provide feedback and status updates during virtual collaborative sessions.

A digital assistant represents a voice-activated technology that can simulate a conversation and perform various electronic tasks with an intended goal of assisting a user of the digital assistant. Digital assistants typically utilize a combination of advance artificial intelligence (AI), natural language processing (NLP), and machine learning to receive, process, and personalize conversations that the user experiences when interacting with the digital assistant. Algorithms for preforming operational tasks by the digital assistants can create data models that identify patterns of behavior, while subsequently refining those patterns as additional data is added. Through learning via the additional data, digital assistants can provide responses to various questions and provide recommendations depending on a present situation.

SUMMARY

Embodiments in accordance with the present invention disclose a method, computer program product and computer system to provide feedback and status updates during virtual collaborative sessions, the method, computer program product and computer system can monitor, via a primary device associated with a user, a user status for the user participating in a collaborative session with one or more other users. The method, computer program product and computer system can, responsive to determining a user status change for the user is detected, determine a response for the user to provide to the one or more other users based on a user profile and a context for the user status change, wherein the status change indicates an unavailability of the user. The method, computer program product and computer system can, responsive to determining the response is required for the user to provide the one or more other users, send the response to a user device associated with each of the one or more other users.

DETAILED DESCRIPTION

Figure 1:
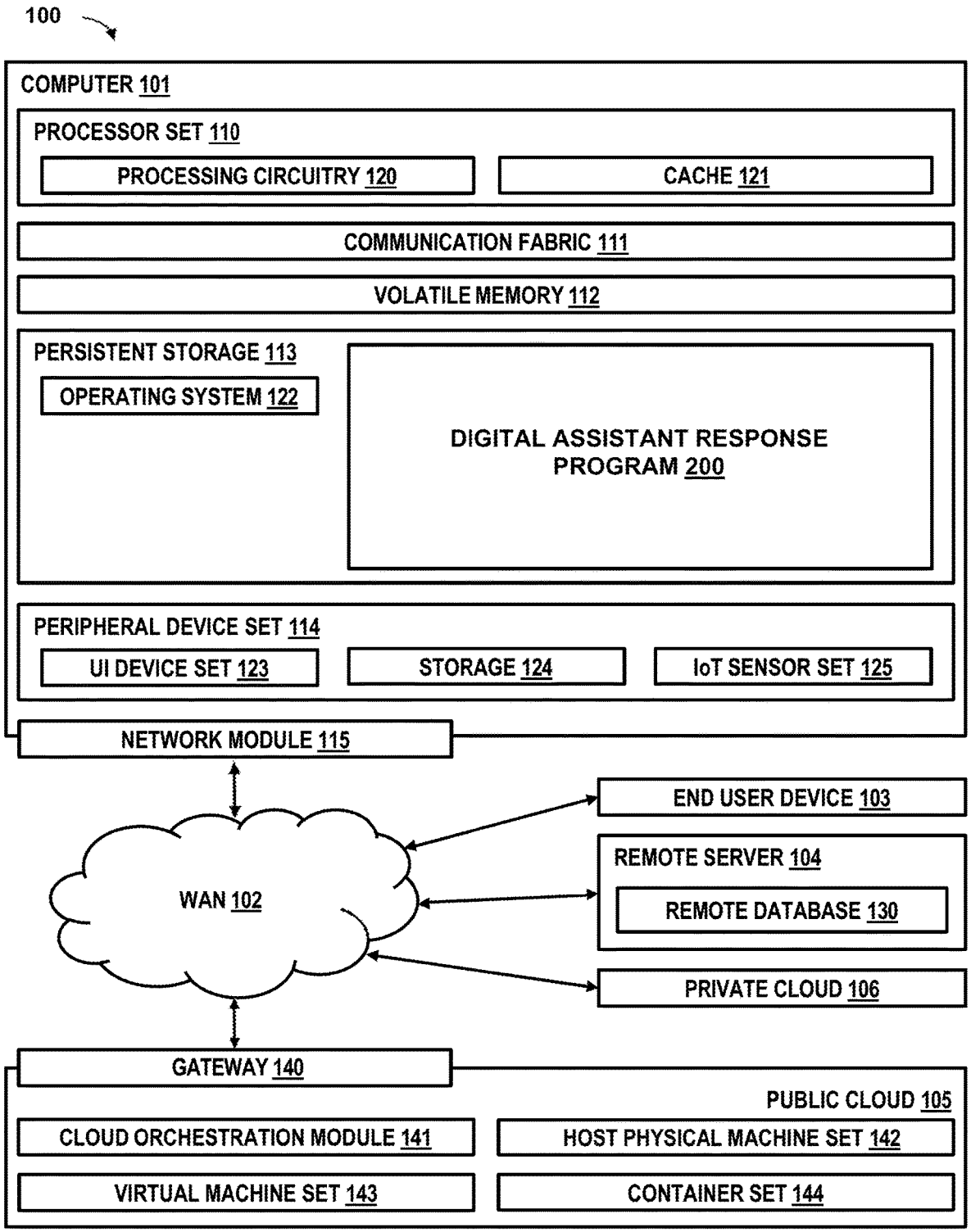
FIG. 1 is a functional block diagram illustrating a computing environment, in accordance with an embodiment of the present invention.

According to an aspect of the invention, there is provided a computer-implemented method, a computer program product, and a computer system that includes monitoring, via a primary device associated with a user, a user status for the user participating in a collaborative session with one or more other users. The computer-implemented method, the computer program product, and the computer system further includes, responsive to determining a user status change for the user is detected, determining a response on behalf of the user to provide to the one or more other users based on a user profile and a context for the user status change, where the status change indicates an unavailability of the user. The computer-implemented method, the computer program product, and the computer system further includes, responsive to determining the response is required for the user to provide the one or more other users, sending the response to a user device associated with each of the one or more other users. A general technical advantage includes providing feedback and status updates to devices associated with multiple users participating in a virtual collaborative session, where one of the multiple users becomes unavailable due to varying reasons including but not limited to network disruptions or emergency based situations.

In some embodiments, for sending the response to a user device associated with each of the one or more other users, the computer-implemented method, the computer program product, and the computer system can further include transmitting audibly the response to the one or more other users, where the response includes a message regarding the unavailability of the user and a summary of the context for the user status change based on a transparency level defined in the user profile. A general technical advantage includes providing an audible feedback and status updates to devices associated with multiple users participating in a virtual collaborative session with a context as to why one of the multiple users has become unavailable, while maintaining the privacy of the user with defined transparency levels.

In some embodiments, for sending the response to a user device associated with each of the one or more other users, the computer-implemented method, the computer program product, and the computer system can further include sending the response to the one or more other users, where the response includes a message regarding the unavailability of the user and a summary of the context for the user status change based on a transparency level defined in the user profile, and where the response is text based. A general technical advantage includes providing a text-based feedback and status updates to devices associated with multiple users participating in a virtual collaborative session with a context as to why one of the multiple users has become unavailable, while maintaining the privacy of the user with defined transparency levels.

In some embodiments, the computer-implemented method, the computer program product, and the computer system can further include recording a portion of the collaborative session between a detecting of the user status change for the user and a determining that the response is required on behalf of the user to provide to the one or more other users. The computer-implemented method, the computer program product, and the computer system can further include providing, via the primary device, the recording of the portion of the collaborative session to the user. A general technical advantage for this optional feature includes providing a recording for a portion of a virtual collaborative session missed by one of the multiple users during an instance of unavailability.

In some embodiments, the computer-implemented method, the computer program product, and the computer system can further include, responsive to determining a time value has been reached, providing a final status to the one or more other users participating the collaborative session and terminating, at the primary device, the collaborative session for the user. A general technical advantage for this optional feature includes providing a final feedback and status updates to devices associated with multiple users participating in a virtual collaborative session for one of the multiple users and terminating the virtual collaborative session for the one user to maintain security integrity by avoiding the divulgence of sensitive information being viewed on the device associated with the one user during an instance of unavailability.

In some embodiments, the computer-implemented method, the computer program product, and the computer system can further include, identifying the primary device is experiencing a connection disruption with a secondary device being utilized by the user to audibly communicate with the one or more other users and determining the user status change for the user is detected based on the connection disruption. A general technical advantage for this optional feature includes identifying potential connection disruptions and preemptively determining a user status changed based on a potential unavailability of the user.

In some embodiments, the computer-implemented method, the computer program product, and the computer system can further include, identifying a second device sharing a local network with the primary device is activated and determining the user status change for the user is detected based on an activation of the second device. A general technical advantage for this optional feature includes utilizing activity on a second device associated with the user to determine potential unavailability of the user on a primary device associated with the user.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, digital assistant response program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
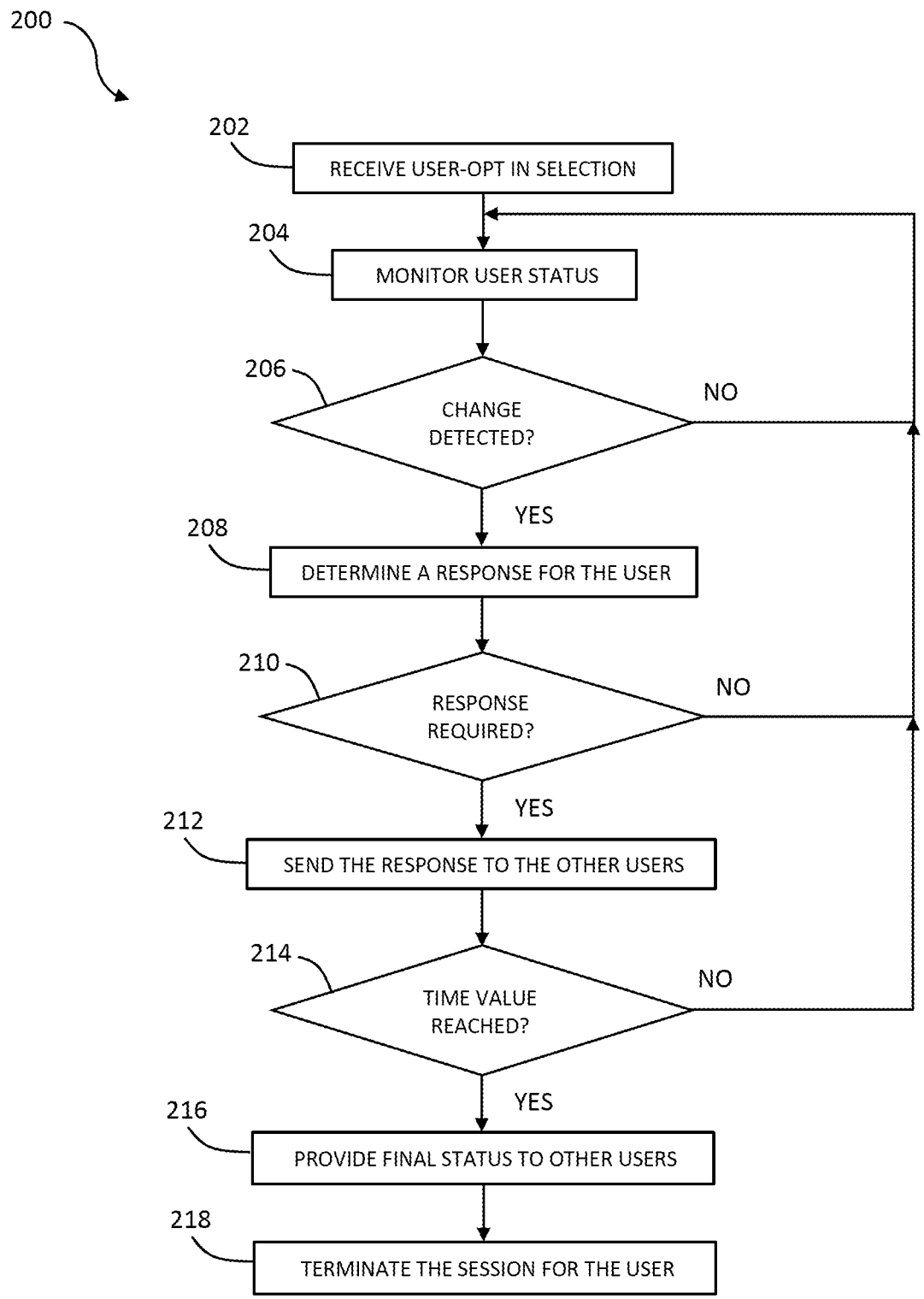
FIG. 2 depicts a flowchart for components of a digital assistant response program for providing real-time feedback and contextualized status updates for a user attending a virtual collaborative session, in accordance with an embodiment of the present invention.

FIG. 2 depicts a flowchart for components of a digital assistant response program for providing real-time feedback and contextualized status updates for a user attending a virtual collaborative session, in accordance with an embodiment of the present invention.

Digital assistant response program 200 receives a user-opt in selection (202). The user opt-in selection serves as a user confirmation for allowing digital assistant response program 200 to provide feedback and status updates for a user during virtual collaborative sessions with other users. Through the user confirmation, the user opt-in selection also serves as a way for digital assistant response program 200 to maintain user privacy through boundaries established by the user via a user profile. The user profile associated with the user can include pre-established base settings and/or customizable settings that dictate a response that digital assistant response program 200 provides to other users participating in the virtual collaborative session. Digital assistant response program 200 utilizes the pre-established base settings and/or the customizable settings of the user profile determine a situational profile for the virtual collaborative session and determine a response for the user based on the change in the user status, discussed in more detail with regards to (208). The user profile can define interaction types, participant types, transparency levels, and reasons for inactivity. Interaction types can include but are not limited to an instant message, an audio call, a video call, and an augmented reality (VR) setting, where the user interacts with one or more other users in a virtual collaborative session. Participant types can include but are not limited to social acquaintances, professional colleagues, managers, customers, and partners, where one or more participant types is associated with each of the one or more other users in the virtual collaborative session. For discussion purposed, each of the one or more other users can be interchangeably referred to as a participant of the collaborative session.

Transparency levels can include a range of details that digital assistant response program 200 provides in a response for the user to the one or more other users in the virtual collaborative session. For a lower transparency level, digital assistant response program 200 provides a minimal amount of information to the one or more other users in the collaborative session for the user with a changed status. In one example, for a low transparency level, digital assistant response program 200 provides a status for the user to the one or more other users in the collaborative video session, such as, "Bill is currently away". For a higher transparency level, digital assistant response program 200 provides additional context to the minimal amount of information to the one or more other users in the collaborative session for the user with a changed status. In one example, for a high transparency level, digital assistant response program 200 provides a status for the user to the one or more other users in the collaborative video session, such as, "Bill received another phone call and is currently away". Reasons for inactivity can include an interruption, a disruption, a scheduled break, and a delay. Examples of an interruption can include digital assistant response program 200 detecting the user accepting a phone call on another device or detecting a delivery based on a smart home security system. Examples of a disruption can include a drop in bandwidth for a network connection or a power outage. Examples of a scheduled break can include a calendar entry associated with the user for a period of time in which the collaborative session is occurring. Examples of a delay encompasses other scenarios where there is no response from the user participating in the collaborative session with the one or more other users, where digital assistant response program 200 cannot determine a reason for the inactivity of the user.

Digital assistant response program 200 monitors a user status (204). Digital assistant response program 200 monitors the user status for a user participating in a collaborative session with one or more other users. Monitoring the user status can include digital assistant response program 200 identifying changes with a device being utilized for the collaborative session by the user, changes at a location in which the device is situated, changes in speech patterns of the user, and changes in facial expressions of the user. Examples of changes that digital assistant response program 200 identifies with a device being utilized for the collaborative session by the user can include the device experiencing a power disruption (e.g., battery depletion), the device experiencing a connection disruption with a secondary device (e.g., wireless headphones) utilized by the user to communicate with the one or more other users during the collaborative session, and a device location change (e.g., an area with a strong wireless connection signal to an area with a weak wireless connection signal). Examples of changes that digital assistant response program 200 identifies to a location in which the device is situated can include a change in an audio volume for the surrounding area (e.g., low noise environment to a high noise environment) and an introduction of a voice of another individual, who is not the user participating in the collaborative session (e.g., an individual stopping by an office to ask the user a question). Examples of changes that digital assistant response program 200 identifies in speech patterns of the user can include a sharp decrease in a speaking volume of a user (e.g., answering a phone call) or the user speaking when another user from the one or more other users in the collaborative session is simultaneously speaking (i.e., the user is engaging in a conversation outside of the collaborative session). An example of a change that digital assistant response program 200 identifies in facial expression can include a line of sight of the user no longer being directed to a screen on the device associated with the user participating in the collaborative session, indicating the user's attention is possibly drawn elsewhere.

Digital assistant response program 200 determines whether a change is detected (decision 206). In the event digital assistant response program 200 determines a change is detected ("yes" branch, decision 206), digital assistant response program 200 determines a response for the user (208). In the event digital assistant response program 200 determines a change is not detected ("no" branch, decision 206), digital assistant response program 200 reverts to continuing monitoring a user status.

In this embodiment, digital assistant response program 200 determines whether a change is detected in the user status for the user participating in the collaborative session with the one or more other users. As previously discussed, digital assistant response program 200 monitors the user status which can include identifying changes with a device being utilized for the collaborative session by the user, changes at a location in which the device is situated, changes to a surrounding physical environment, changes in speech patterns of the user, and changes in facial expressions of the user. By identifying changes, digital assistant response program 200 determines a change is detected in the user status for user participating in the collaborative session with the one or more other users.

In one example, digital assistant response program 200 monitors the user status for a user and determines a change is detected in a device being utilized for the collaborative session by the user. Digital assistant response program 200 determines that the device (i.e., primary device) being utilized by the user for the collaborative session is experiencing a connection disruption with wireless headphones (i.e., secondary device) being utilized by the user to communicate with the one or more other users during the collaborative session. Based on this connection disruption, digital assistant response program 200 detects that the user status for the user has changed, since the user may no longer be able to reliably communicate with the one or more other users during the collaborative session. In another example, digital assistant response program 200 monitors the user status for a user and determines a change is detected to a surrounding physical environment. Digital assistant response program 200 determines a voice of another individual, who is not the user participating in the collaborative session. The other individual can be a co-worker asking the user a question, where digital assistant response program 200 can capture the audio from the other individual and determine that the change is detected at the location in which the device is situated. This change in the user status that digital assistant response program 200 determines represents an instance where the user might not be available to communicate (e.g., respond to a request) with the one or more other users in the collaborative session.

In yet another example, digital assistant response program 200 monitors the user status for a user and determines a change is detected at a location in which the device is situated. Digital assistant response program 200 utilizes data from another device (e.g., second device) to determine whether there is a change in the user status of the user participating in the collaborative session, where digital assistant response program 200 receives the data generated by the other device over a local network shared with the device being utilized for the collaborative session and/or digital assistant response program 200 captures the data generated by the other device in the form of audio and/or video. In this example, digital assistant response program 200 determines a doorbell (i.e., a second device) of a home security system that is connected to a local network is activated at a residence, where the device (i.e., first device) being utilized by the user to interact with the one or more other users during the collaborative session is also connected to the local network. Digital assistant response program 200 determines a change of user status when the home security system indicates the front door is open, since the user might be distracted by the activation of the doorbell of the home security system and/or the user might briefly walk away from the device being utilized by the user to interact with the one or more other users during the collaborative session.

Alternatively, digital assistant response program 200 can utilize a microphone to capture a sound for an activation of the doorbell, compare the sound to a repository of sounds for the residence or workplace, and confirm an identification of the captured sound to an activation of the doorbell. For example, a user is interacting with the one or more other users during the collaborative session in a workplace (e.g., private office), when digital assistant response program 200 determines a change is detected at the location in which the device is situated. Utilizing a microphone, digital assistant response program 200 captures a sound from a fire alarm speaker (i.e., second device), compares the sound to a repository of sounds for the workplace, and confirms an identification of the captured sound to a fire alarm. Digital assistant response program 200 determines a change of user status when the fire alarm is activated, since the user might be distracted by the activation of the fire alarm and/or the user might have to evacuate, therefore walking away from the device being utilized by the user to interact with the one or more other users during the collaborative session is also connected to the local network.

Digital assistant response program 200 determines a response for the user (208). In this embodiment, digital assistant response program 200 determines a response on behalf of the user to provide the one or more other users participating in the collaborative session, where digital assistant response program 200 utilizes the user profile and context from the change in the user status to determine the response. As previously discussed, the user profile defines interaction types, participant types, transparency levels, and reasons for inactivity. To ensure an appropriate response is provided for the collaborative session, digital assistant response program 200 identifies an interaction type (e.g., audio call), a number of participants (e.g., five participants), a participant type for each participant (e.g., professional colleagues), and a reason for inactivity (e.g., connection disruption), where the context from the change in the user status provides the reason for inactivity. Digital assistant response program 200 compares the identified interaction type, the number of participants, the type of participants, and the reason for inactivity, to the user profile to determine a transparency level. Based on the determined transparency level, digital assistant response program 200 determines a response to provide the one or more other users (i.e., participants) of the collaborative session. In some embodiments, digital assistant response program 200 can override a transparency level defined in the user profile for an emergency related situation being the reason for the user status change. For example, if a reason for inactivity is related to an activate fire alarm, as discussed in a previous example, digital assistant response program 200 can default to providing a high level of transparency for the response, providing a brief message regarding the inactivity and a summary for the reason.

In one example, digital assistant response program 200 identifies the user is participating in a conference call (i.e., interaction type) with four professional colleagues (i.e., a number and type of participants, where the user accepts a phone call on a second device (i.e., a reason for inactivity). Digital assistant response program 200 compares the identified interaction type, the number of participants, the type of participants, and the reason for inactivity, to the user profile to determine a transparency level. Due to the conference call include the four professional colleagues, digital assistant response program 200 determines a medium transparency level for the response. Digital assistant response program 200 determines a response for the user to include a brief message regarding the inactivity and a brief summary of the context for the disruption, such as, "Mary is currently unavailable due to another call". In another example, digital assistant response program 200 identifies the user is participating in a conference call (i.e., interaction type) with a customer and a program manager (i.e., a number and type of participants, where the device associated with the user is experience a connection disruption with a secondary device (i.e., a reason for inactivity). Digital assistant response program 200 compares the identified interaction type, the number of participants, the type of participants, and the reason for inactivity, to the user profile to determine a transparency level. Due to the conference call include the four professional colleagues, digital assistant response program 200 determines a low transparency level for the response. Digital assistant response program 200 determines a response for the user to include a brief message regarding the inactivity and a brief summary for a reason, such as, "Jim is currently unavailable".

In yet another example, digital assistant response program 200 identifies the user is participating in a conference call (i.e., interaction type) with a customer and a program manager (i.e., a number and type of participants, where digital assistant response program 200 captures a sound from a fire alarm speaker (i.e., second device) which represents the reason for inactivity. Rather than digital assistant response program 200 comparing the identified interaction type, the number of participants, the type of participants, and the reason for inactivity, to the user profile to determine a transparency level, digital assistant response program 200 determines a high transparency level for the response. Due to digital assistant response program 200 determining the change in the user status is due to the fire alarm is related to an emergency event, digital assistant response program 200 determines a response for the user with a high level of transparency. An example of a response that digital assistant response program 200 determines is, "Jim is currently unavailable due to an audible fire alarm".

Digital assistant response program 200 determines whether a response is required (decision 210). In the event digital assistant response program 200 determines a response is required ("yes" branch, decision 210), digital assistant response program 200 sends a response to the other users (212). In the event digital assistant response program 200 determines a response is not required ("no" branch, decision 210), digital assistant response program 200 reverts to continuing monitoring a user status.

In one embodiment, digital assistant response program 200 determines a response is required when the user status changes, where digital assistant response program 200 can subsequently communicate a passive response to the one or more other users participating in the collaborative session. A passive response represents a non-interfering or low interfering response, where digital assistant response program 200 does not audibly interrupt the collaborative session with the response for the user. Examples of a passive response can include a text-based response, such as, a text message, instant message, and an email message. An active response represents a potentially interfering response, where digital assistant response program 200 audibly interrupts the collaborative session with the response for the user. In another embodiment, digital assistant response program 200 determines a response is required when another user from the one or more other users participating in the collaborative session audibly states a name of the user with the changed user status. In yet another embodiment, digital assistant response program 200 determines a response is required when there is an audible pause in the collaborative, where digital assistant response program 200 can communicate the response passively or actively to the one or more other users. Digital assistant response program 200 can utilize a time threshold (e.g., 3 second pause) to identify the audible pause and subsequently determine that a response is required.

Digital assistant response program 200 sends a response to the other users (212). As previously discussed, digital assistant response program 200 can send the response passively and/or actively to the one or more other users participating in the collaborative session. In one embodiment, digital assistant response program 200 determines a response is required and audibly transmits (i.e., communicates) the response for the user to the one or more other users participating in the collaborative session. In another embodiment, digital assistant response program 200 determines a response is required and sends (i.e., communicates) a text-based response to the one or more other users participating in the collaborative session. Digital assistant response program 200 can send the text-based response in a messaging window of an application (e.g., video conference application) supporting the collaborative session, as an individual instant message to each of the one or more other users, and/or as an individual email to each of the one or more other users. In some embodiments, digital assistant response program 200 provides a selectable option to the one or more other users participating in collaborative session, where the selectable option allows for each of the one or more other users to provide a text and/or audible statement for the response provided by digital assistant response program 200 on behalf of the user who is unavailable. Digital assistant response program 200 can subsequently send the text and/or audible statement to the user who is unavailable. For example, if user A asks user B a question while user B was unavailable, digital assistant response program 200 communicates the response to user A regarding the unavailability of user B and provide an option to user A to provide a statement to user B. The statement that user A provides can include the question that user A asked user B while unavailable. In some embodiments, digital assistant response program 200 can record a portion of a collaborative session between the determined user status change and when digital assistant response program 200 communicates the response to the other users and can send the recorded portion to the user for subsequent replay.

Digital assistant response program 200 determines whether a time value has been reached (decision 214). In the event digital assistant response program 200 determines a time value has been reached ("yes" branch, decision 214), digital assistant response program 200 provides a final status to other users (216). In the event digital assistant response program 200 determines a time value has not been reached ("no" branch, decision 214), digital assistant response program 200 reverts to continuing to monitor a user status. In one embodiment, the time value is defined by the user (e.g., 5 minutes), where digital assistant response program 200 determines whether the user defined time value has been reached. In another embodiment, the time value is a default value (e.g., 10 minutes), where digital assistant response program 200 determines whether the default defined time value has been reached. For enterprise based embodiments, the time value is defined based on pre-established security protocols for the enterprise that is utilizing digital assistant response program 200 for collaborative sessions.

Digital assistant response program 200 provides a final status to other users (216). Digital assistant response program 200 provides a passive or active final status to each of the one or more other users participating in the collaborative session. An example of a passive final status can be a text-based status stating a session for the user who is unavailable is being terminated and any recording of the collaborative session will be provided to the user who is unavailable. An example of an active final status can be a audio-based status stating a session for the user who is unavailable is being terminated and any recording of the collaborative session will be provided to the user who is unavailable. Digital assistant response program 200 can also provide an option to each of the one or more other users to send any additional text-based and/or audio-based final statements to the user who is unavailable. Digital assistant response program 200 utilizes the user profile and context from the change in the user status to determine the passive and/or active final status to provide to the one or more other users of the collaborative session.

Digital assistant response program 200 terminates the session for the user (218). In one embodiment, digital assistant response program 200 terminates the session for the user by disconnecting the user from the collaborative session with the one or more other user. Digital assistant response program 200 can further log the user out of the collaborative session software to ensure security integrate is maintained, since the user is no longer available based on the user status from (206). By logging the user of the collaborative session software, the user will subsequently have to log back into the collaborative session software once they become available again.

In some embodiment, digital assistant response program 200 utilizes iterative learning to provide more detailed and/or personalized responses on behalf of user during instance of unavailability. Digital assistant response program 200 can request feedback from the user after determining a response for each instance of unavailability, where digital assistant response program 200 can receive one or more edits to the response and update the user profile for the user based on the one or more edits.

Figure 3A:
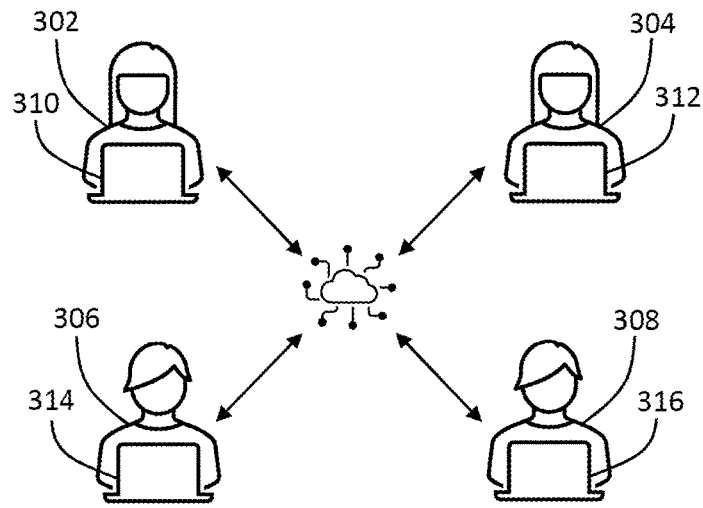
FIG. 3A depicts an example virtual collaborative session in which of a digital assistant response program operates, in accordance with an embodiment of the present invention.

FIG. 3A depicts an example virtual collaborative session in which of a digital assistant response program operates, in accordance with an embodiment of the present invention. In this example, users 302, 304, 306, and 308 are taking in a virtual collaborative session, where digital assistant response program 200 monitors a user status for each user and provides feedback and status updates in form of a response during instances of unavailability. User 302 is utilizing device 310, user 304 is utilizing device 312, user 306 is utilizing device 314, and user 308 is utilizing device 316 to connect to the virtual collaborative session. Each of the users 302, 304, 306, and 308 have an associated user profile with digital assistant response program 200, where each profile includes base settings and/or customizable settings by each user. A previously discussed, each user profile for users 302, 304, 306, and 308 can define interaction types, participant types, transparency levels, and reasons for inactivity. Digital assistant response program 200 monitors a user status for each of users 302, 304, 306, and 308 and determines whether a change in the user status for each of users 302, 304, 306, and 308 is detected.

Figure 3B:
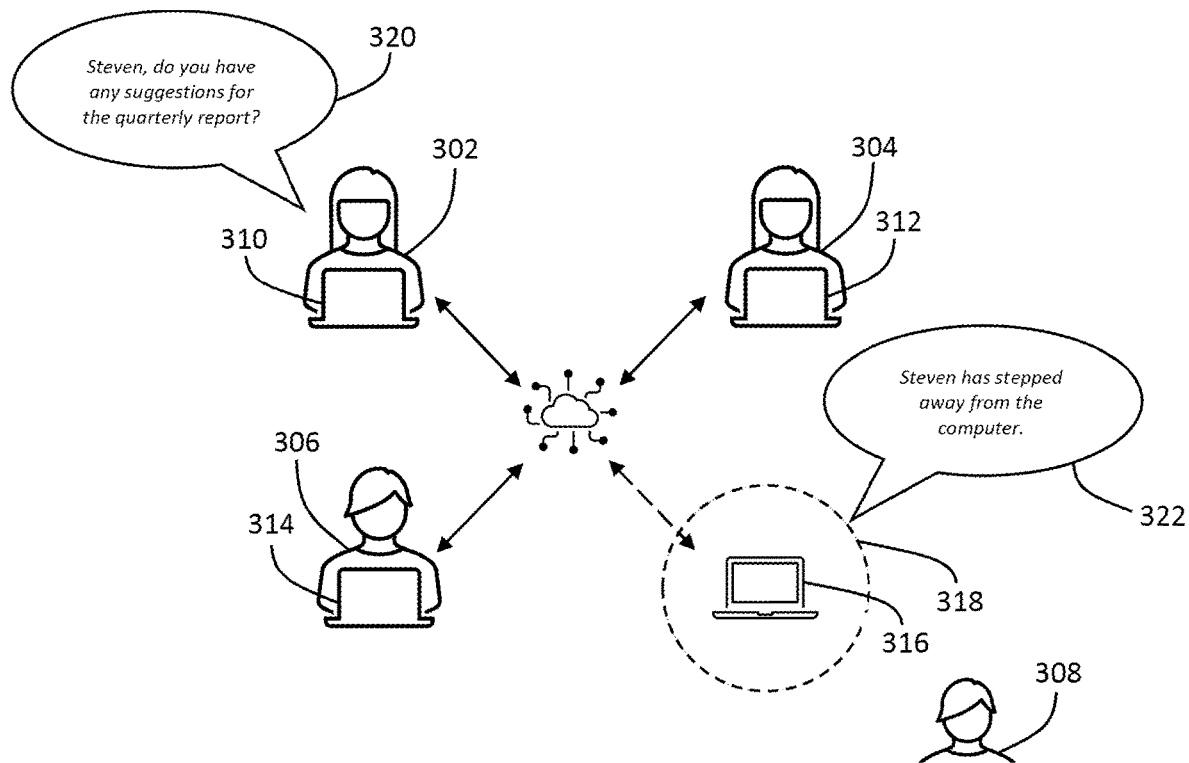
FIG. 3B depicts an example virtual collaborative session in which of a digital assistant response program provides real-time feedback and a contextualized status update for an unavailable user of the virtual collaborative session, in accordance with an embodiment of the present invention.

FIG. 3B depicts an example virtual collaborative session in which of a digital assistant response program provides real-time feedback and a contextualized status update for an unavailable user of the virtual collaborative session, in accordance with an embodiment of the present invention.

In this example, digital assistant response program 200 determines a change is detected in the user status of user 308, where user 308 is no longer available. Digital assistant response program 200 determines a doorbell (i.e., a second device) of a home security system that is connected to a local network shared with device 316 is activated at a residence, where device 316 (i.e., first device) being utilized by user 308 to interact with users 302, 304, and 306 during the virtual collaborative session is also connected to the local network. Digital assistant response program 200 determines a change of user status for user 308 when the home security system indicates the front door is open, since the user briefly walked away from device 316 defined by audible vicinity 318. Digital assistant response program 200 determines a response for user 308 utilizing the user profile for user 308 and context from the change in the user status of user 308 to determine the response. Digital assistant response program 200 determines a response is required for user 308 when user 302 audibly states a name of user 308, along with a subsequent question in statement 320. Statement 320 directed at user 308 includes the following, "Steven, do you have any suggestions for the quarterly report?" Based on the user profile for user 308 and the context from the change in the user status of user 308, digital assistant response program 200 communicates audible response 322 to users 302, 304, and 306 participating in the collaborative session. The audible response includes the following, "Steven has stepped away from the computer". In this example, digital assistant response program 200 utilized a low transparency level to determine a response for user 308, where the low transparency level prevents digital assistant response program 200 from providing details (i.e., context) to users 302, 304, and 306 regarding the reason for the unavailability of user 308.

Figure 3C:
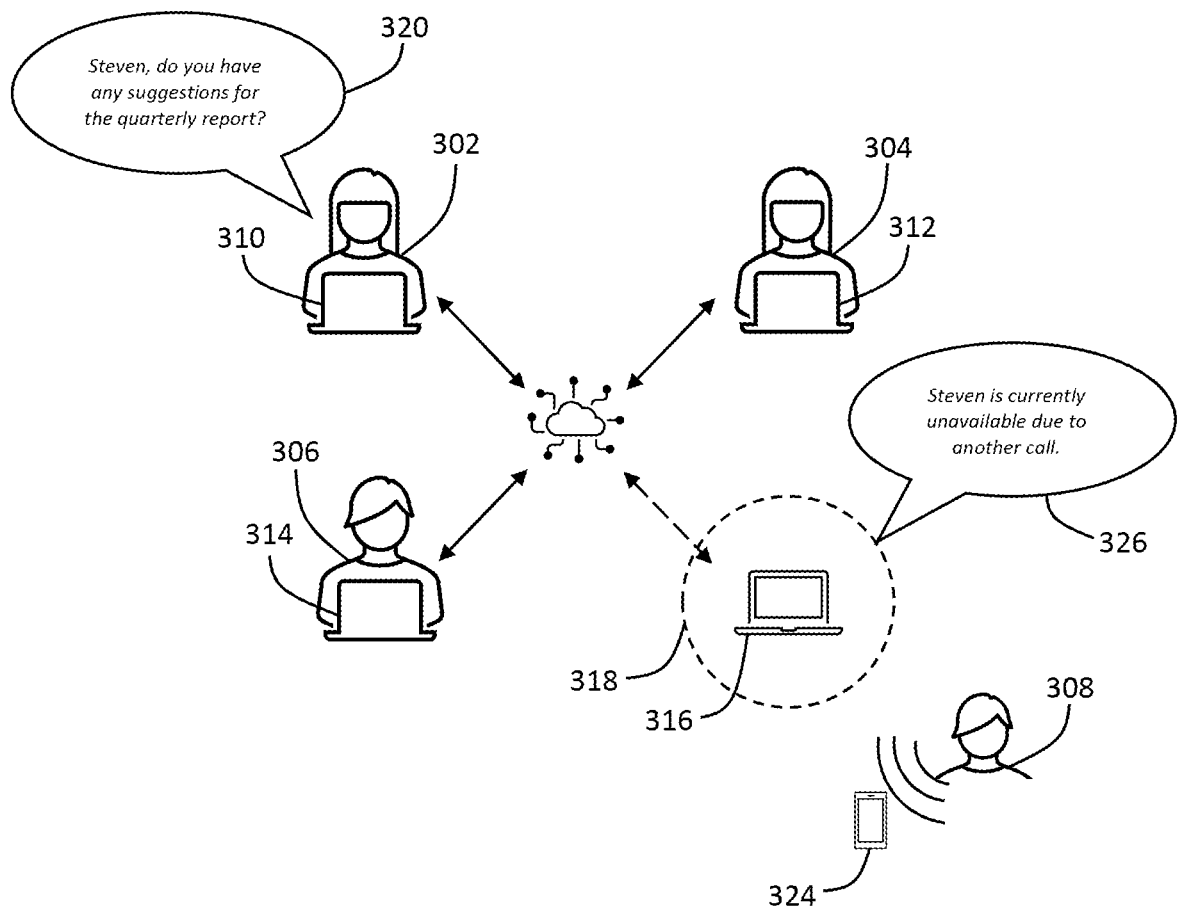
FIG. 3C depicts an example virtual collaborative session in which of a digital assistant response program provides a summary to an unavailable user of the virtual collaborative session, in accordance with an embodiment of the present invention.

FIG. 3C depicts an example virtual collaborative session in which of a digital assistant response program provides a summary to an unavailable user of the virtual collaborative session, in accordance with an embodiment of the present invention. In this example, digital assistant response program 200 determines a change is detected in the user status of user 308, where user 308 is no longer available. Digital assistant response program 200 determines user 308 is taking a phone call on a secondary device (e.g., mobile device 324) based on identifying a speech pattern for user 308 that includes a sharp decrease in a speaking volume of a user. The sharp decrease in the speaking volume indicates that user 308 is communicating with someone outside of the virtual collaborative session on mobile device 324 connected to the same local network as device 316, where digital assistant response program 200 can query device 316 on the local network to determine if a phone call is active. Additionally, if the secondary device shares the same local network as device 316, digital assistant response program 200 can query the secondary device to determine whether a phone call is active. Digital assistant response program 200 determines a response for user 308 utilizing the user profile for user 308 and context from the change in the user status of user 308 to determine the response. Digital assistant response program 200 determines a response is required for user 308 when user 302 audibly states a name of user 308, along with a subsequent question in statement 320. Statement 320 directed at user 308 includes the following, "Steven, do you have any suggestions for the quarterly report?" Based on the user profile for user 308 and the context from the change in the user status of user 308, digital assistant response program 200 communicates audible response 326 to users 302, 304, and 306 participating in the collaborative session. The audible response includes the following, "Steven is currently unavailable due to another call". In this example, digital assistant response program 200 utilized a high transparency level to determine a response for user 308, where the high transparency level includes digital assistant response program 200 providing details (i.e., context) to users 302, 304, and 306 regarding the reason for the unavailability of user 308.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, via a primary device associated with a user, a user status for the user participating in a collaborative session with one or more other users;
identifying a second device associated with the user sharing a local network with the primary device is activated;
determining a user status change for the user is detected based on an activation of the second device;
determining a response on behalf of the user to provide to the one or more other users based on a user profile and a context for the user status change, wherein the status change indicates an unavailability of the user;
determining the response is required for the user to provide the one or more other users; and
sending the response to a user device associated with each of the one or more other users.

2. The computer-implemented method of claim 1, wherein sending the response to a user device associated with each of the one or more other users further comprises:
transmitting audibly the response to the one or more other users, wherein the response includes a message regarding the unavailability of the user and a summary of the context for the user status change based on a transparency level defined in the user profile.

3. The computer-implemented method of claim 1, wherein sending the response to a user device associated with each of the one or more other users further comprises:
sending the response to the one or more other users, wherein the response includes a message regarding the unavailability of the user and a summary of the context for the user status change based on a transparency level defined in the user profile, wherein the response is text based.

4. The computer-implemented method of claim 1, further comprising:
recording a portion of the collaborative session between a detecting of the user status change for the user and a determining that the response is required on behalf of the user to provide to the one or more other users; and
providing, via the primary device, the recording of the portion of the collaborative session to the user.

5. The computer-implemented method of claim 1, further comprising:
responsive to determining a time value has been reached, providing a final status to the one or more other users participating the collaborative session; and
terminating, at the primary device, the collaborative session for the user.

6. A computer program product comprising:
one or more computer-readable storage media;
program instructions, stored on at least one of the one or more storage media, to monitor, via a primary device associated with a user, a user status for the user participating in a collaborative session with one or more other users;
program instructions, stored on at least one of the one or more storage media, to identify a second device associated with the user sharing a local network with the primary device is activated;
program instructions, stored on at least one of the one or more storage media, to determine a user status change for the user is detected based on an activation of the second device;
program instructions, stored on at least one of the one or more storage media, to determine a response on behalf of the user to provide to the one or more other users based on a user profile and a context for the user status change, wherein the status change indicates an unavailability of the user;
program instructions, stored on at least one of the one or more storage media, to determine the response is required for the user to provide the one or more other users,
program instructions, stored on at least one of the one or more storage media, to send the response to a user device associated with each of the one or more other users.

7. The computer program product of claim 6, wherein program instructions, stored on at least one of the one or more storage media, to send the response to a user device associated with each of the one or more other users, further comprises:
program instructions, stored on at least one of the one or more storage media, to transmit audibly the response to the one or more other users, wherein the response includes a message regarding the unavailability of the user and a summary of the context for the user status change based on a transparency level defined in the user profile.

8. The computer program product of claim 6, wherein program instructions, stored on at least one of the one or more storage media, to send the response to a user device associated with each of the one or more other users, further comprises:
program instructions, stored on at least one of the one or more storage media, to send the response to the one or more other users, wherein the response includes a message regarding the unavailability of the user and a summary of the context for the user status change based on a transparency level defined in the user profile, wherein the response is text based.

9. The computer program product of claim 6, further comprising:
program instructions, stored on at least one of the one or more storage media, to record a portion of the collaborative session between a detecting of the user status change for the user and a determining that the response is required on behalf of the user to provide to the one or more other users; and
program instructions, stored on at least one of the one or more storage media, to provide, via the primary device, the recording of the portion of the collaborative session to the user.

10. The computer program product of claim 6, further comprising:
program instructions, stored on at least one of the one or more storage media, responsive to determining a time value has been reached, to provide a final status to the one or more other users participating the collaborative session; and
program instructions, stored on at least one of the one or more storage media, to terminate, at the primary device, the collaborative session for the user.

11. A computer system comprising:
one or more processors, one or more computer-readable memories and one or more computer-readable storage media;
program instructions, stored on at least one of the one or more storage media for execution by at least one of the one or more processors via at least one of the one or more memories, to monitor, via a primary device associated with a user, a user status for the user participating in a collaborative session with one or more other users;
program instructions, stored on at least one of the one or more storage media for execution by at least one of the one or more processors via at least one of the one or more memories, to identify a second device associated with the user sharing a local network with the primary device is activated;
program instructions, stored on at least one of the one or more storage media for execution by at least one of the one or more processors via at least one of the one or more memories, to determine a user status change for the user is detected based on an activation of the second device;
program instructions, stored on at least one of the one or more storage media for execution by at least one of the one or more processors via at least one of the one or more memories, to determine a response on behalf of the user to provide to the one or more other users based on a user profile and a context for the user status change, wherein the status change indicates an unavailability of the user;
program instructions, stored on at least one of the one or more storage media for execution by at least one of the one or more processors via at least one of the one or more memories, to determine the response is required for the user to provide the one or more other users;
program instructions, stored on at least one of the one or more storage media for execution by at least one of the one or more processors via at least one of the one or more memories, to send the response to a user device associated with each of the one or more other users.

12. The computer system of claim 11, wherein program instructions, stored on at least one of the one or more storage media for execution by at least one of the one or more processors via at least one of the one or more memories, to send the response to a user device associated with each of the one or more other users, further comprises:
- program instructions, stored on at least one of the one or more storage media for execution by at least one of the one or more processors via at least one of the one or more memories, to transmit audibly the response to the one or more other users, wherein the response includes a message regarding the unavailability of the user and a summary of the context for the user status change based on a transparency level defined in the user profile.

13. The computer system of claim 11, wherein program instructions, stored on at least one of the one or more storage media for execution by at least one of the one or more processors via at least one of the one or more memories, to send the response to a user device associated with each of the one or more other users, further comprises:
- program instructions, stored on at least one of the one or more storage media for execution by at least one of the one or more processors via at least one of the one or more memories, to send the response to the one or more other users, wherein the response includes a message regarding the unavailability of the user and a summary of the context for the user status change based on a transparency level defined in the user profile, wherein the response is text based.

14. The computer system of claim 11, further comprising:
- program instructions, stored on at least one of the one or more storage media for execution by at least one of the one or more processors via at least one of the one or more memories, to record a portion of the collaborative session between a detecting of the user status change for the user and a determining that the response is required on behalf of the user to provide to the one or more other users; and
- program instructions, stored on at least one of the one or more storage media for execution by at least one of the one or more processors via at least one of the one or more memories, to provide, via the primary device, the recording of the portion of the collaborative session to the user.

15. The computer system of claim 11, further comprising:
- program instructions, stored on at least one of the one or more storage media for execution by at least one of the one or more processors via at least one of the one or more memories, responsive to determining a time value has been reached, to provide a final status to the one or more other users participating the collaborative session; and
- program instructions, stored on at least one of the one or more storage media for execution by at least one of the one or more processors via at least one of the one or more memories, to terminate, at the primary device, the collaborative session for the user.

\* \* \* \* \*